Patented Aug. 24, 1948

2,447,732

UNITED STATES PATENT OFFICE 2,447,732

RUBBER-RECLAIMING OIL

Charles H. Campbell, Kent, Ohio, and Robert W. Ostermayer, Clairton, Pa.; said Ostermayer assignor to said Campbell No Drawing. Application July 16, 1945, Serial No. 605,434

4 Claims. (Cl. 260—718)

This invention relates to a rubber-reclaiming oil and to the method of its use in reclaiming scrap rubber, and the application herein is a continuation-in-part of our application, Serial No. 341,140, filed June 18, 1940.

In one currently practiced process of reclaiming rubber, the scrap rubber which is the stock to be reclaimed is brought into a condition of relatively fine division; and after it has been screened to remove associated fibrous material it is subjected to heat and pressure in the presence of moisture. Usually an alkali, such as sodium hydroxide, is present during the treatment of the stock with heat and pressure, for the purpose of breaking down any fabric remaining with the rubber and to reduce the percentage of sulphur in the stock. It is standard practice also to include with the scrap rubber during the treatment with heat, pressure and alkali, an oil which serves to soften and swell the rubber and assists materially in bringing it into condition for reworking. It is to be understood that in the modern reclaiming processes to which reference is here made the function of the reclaiming oil is not to dissolve the rubber for subsequent recovery by precipitation, or coagulation, but that its function is to swell and soften the rubber for reworking.

Following the digestion treatment of the scrap rubber, the stock is further processed prior to recompounding and working by blowing down the digestor in which the stock has been prepared, by removing as much caustic solution as possible by pressure washing with water and steam, and by evaporative drying. The substantial equivalents of these latter process steps sometimes are employed. It is in the composition of the reclaiming oil for softening and swelling the rubber that the invention of this present method primarily resides. It is of importance that, when under the conditions of the process the rubber has been opened up and initially swelled by heat and pressure, the reclaiming oil be able so to penetrate the rubber and to have such an enduring softening and further swelling effect thereon as to give effectiveness to the fundamental treatment with heat and pressure. It is thus by the effect of the oil that the rubber is kept sufficiently soft and spongy for reworking and recompounding. It also is important that in the digesting steps of the process, the oil should not impart permanently to the rubber such excessive tackiness as seriously to interfere with working the stock.

It is the object of our invention so to conduct a reclaiming process on natural rubber, using a novel reclaiming oil which we have found particularly desirable for the purpose; and so to relate the conditions of the process to the novel oil that the reclaimed stock is in good condition for working and works well in the rolls, being neither dry and friable nor unduly mushy or tacky.

Another object of our invention is to use such oil and so to adjust the conditions of the process to its use, that we obtain as a product a reclaimed rubber of improved sort, because of the ability of the reclaiming oil to take up free sulphur for removal from the stock, and because of the property of the oil in leaving some softening content of relatively high boiling oil in the reclaimed rubber.

Primarily we have discovered that an ideal oil for use in rubber reclaiming may be blended from two unlike oils, one such component consisting of the resin-forming unsaturates obtained from coke oven light oil in unpolymerized condition, and the other component being one of the aliphatic hydrocarbon oils derived from the distillation of petroleum oil. As derived from petroleum the aliphatic oil may consist either of paraffins or of olefins without substantial resin-forming unsaturation. The resin-forming unsaturates are obtained by distillation of crude light oil which comes over before tar in the by-product coking of coal, and are contained in the coumarone-indene and xylene cut, which contains only such proportion of aromatics devoid of resin-forming unsaturation as are normally included in distillation conducted on a commercial scale.

We are aware that aliphatic hydrocarbon oils have been used as a component of rubber-reclaiming oils, being associated therein with cuts consisting chiefly of the aromatics which are devoid of resin-forming properties and naphthalene, or with the naphthenic oils derived as waste products in the solvent refining of petroleum oils. Also we are aware that prior rubber-reclaiming oils have incidentally contained some small proportion of resin-forming unsaturates within their prescribed boiling ranges; and that the prior art has utilized the lower polymers of resin-forming unsaturates in rubber reclaiming to exert a dissolving and softening effect on the scrap rubber. We do, however, believe ourselves to be the first to discover the advantages of the unpolymerized resin-forming unsaturates of coke oven light oil as a component of a rubber-reclaiming oil. Thus we have discovered that the chemical structure of the resin-forming unsaturates of coke oven light oil gives them particularly high surface tension with attendant high penetrative properties. In pursuance of that discovery, additionally we have found that by use of such resin-forming unsaturates as the penetrative and swelling content of a rubber-reclaiming oil we are able to penetrate and enduringly to swell the particles of the rubber stock which are opened up in the digesting treatment. Penetration of the rubber stock by the composite oil serves also to admit to the interior of the particles a softening content of aliphatic hydrocarbon oil to an extent not previously attained in the art. The softening effect thus obtained endures to give a high grade of reclaimed rubber after the working and recompounding. It is essential in the composition of our rubber-reclaiming oil that the resin-forming unsaturates be in unpolymerized condition, because even the lowest polymers of such unsaturates, although they have fair solvent power, are so lacking in penetrative properties that they are incapable of performing effectively the desired function of entering and swelling the rubber particles, and can be used only in large quantity to soften the rubber or wholly to dissolve it.

In obtaining from coke oven light oil the resin-forming unsaturates forming one component of the rubber-reclaiming oil we take such cut that it consists more than 50% of one or more of the resin-forming unsaturates styrene, coumarone and indene. Such cut of crude coke oven light oil may be either toward the styrene end containing but little coumarone and indene, or toward the coumarone and indene end containing little or no styrene. Within the limits of the distillation range, however, the cut is composed preponderantly of these resin-forming unsaturates.

Thus we take the cut of coke oven light oil which boils within the approximate range of 120° C. to 265° C., and which boils over 60% within the approximate range of 135° C. to 210° C., or any distillation fraction of that cut. This cut, or any fraction thereof boiling at least 60% below 210° C., consists over 50% of resin-forming unsaturates, either coumarone and indene or styrene, or mixtures of those resin-forming unsaturates. It is possible by careful treatment to obtain within the cut a low boiling oil which consists in substantial entirety of resin-forming unsaturates. In practical effect, and in accordance with commercial considerations, however, it is generally desirable to accept such cuts coming within the prescribed range as have more than 50% of the resin-forming unsaturates without seeking to obtain approximate perfection in their composition.

As the aliphatic content of the blend we use a petroleum naphtha, or analogous petroleum cut distilling within the approximate range of about 200° C. to 280° C. Using this aliphatic oil within our contemplated proportion range gives a blend having an adequately high flash point for safe use in the rubber-reclaiming process.

It is to be understood that the aliphatic hydrocarbon oil from the distillation of petroleum oil distilling within the approximate range of 200° C. to 280° C. may contain those cyclo-paraffins known as naphthenes, and may contain olefins as well as paraffins, and by "aliphatic hydrocarbon oil from the distillation of petroleum" we inherently mean an oil obtained from the distillation of petroleum without such treatment as to produce any substantial content of cyclic compounds. Also by such term used in distinction from the resin-forming unsaturates forming one component of our reclaiming oil, we mean an oil which though it may be olefinic rather than paraffinic is not resin-forming by virtue of the diene structure as are the diolefins.

It should be understood that in the composition the content of resin-forming unsaturates performs the function of penetrating and swelling the rubber. This function the resin-forming unsaturates are particularly well suited to perform, because their chemical structure gives them high surface tension which causes them to creep over the surfaces of the individual particles of a mass of reclaiming stock in the digestor. In the proportioning suited to the rubber stock which is being reclaimed and the conditions of the process the aliphatic hydrocarbon oil does not detract from that power of penetration. On the contrary the penetrative ability of the unpolymerized resin-forming unsaturates serves suitably to introduce the softening content of aliphatic oil into the body of the scrap rubber to prepare a reclaim stock in good condition for working. The non-resin-forming content of the light oil cut; that is, the content of mono-nuclear and poly-nuclear benzene ring compounds which do not possess such conjugate unsaturation as to render them resin-forming, such as benzol, toluol, xylol, cumene and pseudo-cumene, are relatively undesirable as compared with the resin-forming content of the cut. This is for the reason that while such substances have good solvent power, they lack the high surface tension and penetrative property which goes with the chemical structure of the resin-forming unsaturates of coke oven light oil.

From a different viewpoint, the high penetrative properties of the resin-forming unsaturates permit them to be used in a smaller proportion with respect to the content of aliphatic oil in the blend than is the case with the compounds of the coke oven light oil and analogous compounds, which do not have resin-forming unsaturation. The high proportion of resin-forming unsaturates functions in the process to give a reclaiming oil which desirably softens the rubber for working without making it persistently tacky. Also with a blend having a satisfactory content of resin-forming unsaturates with respect to the aliphatic hydrocarbon oil a low total proportion of the reclaiming oil can be used effectively.

Taking the prescribed cut boiling over 60% within the approximately range of 135° C. to 210° C. having a concentration of more than 50% resin-forming unsaturates, we can blend it with the aliphatic hydrocarbon oil in a varied proportion of 50% to 80% of the resin-forming unsaturate cut with 20% to 50% of the aliphatic hydrocarbon oil.

A reclaiming oil consisting about 60% of a cut of crude coke oven light oil boiling over 60% within the approximate range of 135° C. to 210° C., and which has therefore a resin-forming content over 50%, with about 40% of the aliphatic hydrocarbon oil boiling within the approximate range of 200° C. to 280° C., may be considered to be our standard composition preferred for the reason that it is best adapted to conform to varying conditions in rubber reclaiming. If we assume an efficiently conducted rubber-digesting process utilizing a steam pressure of from about 160 lbs. to 250 lbs., or more, for reclaiming what may be considered a high grade of scrap rubber, the reclaiming oil desirably is used in a quantity equal to about 4% to 10% the weight of the rubber for summer temperatures, and about 6% to 12% the weight of the rubber for winter temperatures.

It may be explained, that in modern reclaiming practice there are two generally accepted methods of digesting the scrap rubber. In the autoclave, or "wet," process high steam pressure with the high temperature attendant on it is used, initially to soften and open up the particles of rubber subjected to digestion. In the "pan" process of digestion heat is used initially to soften the rubber, and the pressure of vapors generated under the influence of the heat serves to open up and swell the particles. In present day practice, the autoclave process is used when the scrap rubber may retain some content of fabric after it has been screened, and that process is preferred if the rubber is difficult to bring into workable condition and a high grade of reclaimed rubber is required. The pan process is used only on scrap rubber which has no retained fiber content. It thus may be used satisfactorily in reclaiming scrap rubber from the inner tubes of vehicle tires which is easily reclaimable; and scrap rubber from mechanical goods in which the reclaimed product need not be brought to a particularly high order of softness and flexibility.

In practice under both variants of the digestion process, the conditions vary widely in accordance with the specific properties of the scrap which is subjected to digestion. Assuming that all the scrap with which we are here concerned consists wholly of natural rubber, there is none the less great variation in the severity of the treatment required to bring different grades of rubber such as rubber from the shoes of vehicle tires, scrap from mechanical goods, and the like into condition for reworking. The time of treatment, the steam pressure employed in an autoclave digestion, and the like factors are therefore to be considered as variables.

Under present day practice the steam pressure employed varies from about 160 lbs. to 250 lbs. and the time of treatment from about 10 hours to 40 hours. There is, however, a current tendency toward even higher steam pressures with a corresponding decrease in the length of time required for digesting the scrap, and the employment of steam pressures substantially exceeding 250 lbs. is in immediate contemplation. It is also the current tendency in the trade to make the pan process more efficient by increasing the temperature of the treatment, and by increasing the quantity and effectiveness of the reclaiming oil used in it. In accordance with the best current practice in digesting by the pan process, we use temperatures of from about 300° F. to 500° F. and the time of treatment is from about 7 hours to 20 hours. It may be noted generally that in preparing the scrap rubber for digestion it usually is ground to a size which will pass through screens of 3 to 5 meshes to the inch. A 3 mesh screen size may be used satisfactorily for digestion in an autoclave, but a 5 mesh screen size is preferable for pan digestion. Also assuming that rubber of the same characteristics is treated alternatively in an autoclave or by pan digestion, about 15% to 30% more reclaiming oil is used in the pan process than in the autoclave.

It readily will be understood that our novel reclaiming oil, because of its property of high penetration and its ability readily to complete the swelling of the rubber and enduringly to swell it, is peculiarly well adapted to use in reclaiming practice as that practice develops toward higher efficiency and decreased time for digestion.

To give a typical exemplification of a reclaiming process in accordance with our invention, a substantial weight of vehicle tires was taken as the starting material. These tires were cut into relatively small pieces, without attempting to segregate the different component parts of the tires. The stock was then ground fine enough to pass through a screen of 3 meshes to the inch and was fluffed and air blown, to remove most of its fiber content. It then was passed under magnets, to remove nails and other pieces and particles.

The mass of rubber particles for reclaiming then was mixed mechanically with the rubber-reclaiming oil composed 65% of the crude resin-bearing coke oven light oil cut and 35% of petroleum naphtha, in a quantity equal to 7% the weight of the rubber. The mass, carrying the reclaiming oil was introduced into an autoclave, together wtih about 3% its weight of a 20% caustic soda solution. Steam was run in to build up a steam pressure of about 200 lbs. per square inch and a corresponding temperature. About 7 hours was spent in heating up the batch, and it then was held at that temperature for about 12 hours. The batch then was allowed to coast and cool.

After the batch had cooled sufficiently, the upper valve of the autoclave was released and vapors were blown off. These vapors consisted largely of the lighter end of the coke oven light oil cut, some of the heavier end of that component and a large proportion of the petroleum naphtha being retained by the rubber. The bottom valve of the autoclave was then opened and the moisture and alkali were drained off. It may be noted that in passing off as vapors, the resin-forming unsaturates of the reclaiming oil carry with them the content of free sulphur which they have absorbed.

At this stage of the complete process tailings were removed and tack-increasing and compounding ingredients were added. It is to be noted that some smoothing agent additional to that provided by the retained heavy end of the reclaiming oil may be included in this stage. The stock then went to mills, where it was worked and sheeted.

Specifically, the reclaiming oil used in the above procedure had as its penetrative and swelling component a coke oven light oil cut boiling about 70% below 210° C.

The reclaiming oil described above is of even greater utility in conducting a reclaiming operation by the "pan" process of digestion. In following procedure in accordance with our invention in which high pressure steam was not used, initially the rubber scrap for reclaiming was cut and ground to pass through a screen of 5 meshes to the inch. This reclaim stock was of selected fabric-free sort, being a scrap natural rubber from the inner tubes of vehicle tires. The mass of rubber particles for reclaiming then was mixed mechanically with the rubber-reclaiming oil in a quantity of the oil equal to 10% the weight of the rubber. Specifically, the oil used was composed 75% of the crude resin-bearing coke oven light oil cut and 25% of petroleum naphtha. The coke oven light oil cut providing the penetrative and swelling component of the oil was a cut boiling about 80% below 210° C. Thus it will be seen that for this variant of the reclaiming process the reclaiming oil is used in increased proportions and also is so composed as to contain a higher proportion of lighter volatiles.

The ground reclaim stock with its coating of oil then was placed in large pans and the pans were racked in an oven. As is desirable, some water was held near the bottom of the oven to prevent scorching. The oven was closed to render it substantially airtight and heat was applied. The temperature of the oven was raised sufficiently, that is to about 350° F., to vaporize the more volatile components of the oil, and to build up a substantial pressure of those vapors in the oven. The treatment was continued for about 10 hours, at which time the oven was opened and the vapors permitted to escape.

By using an adequate quantity of the oil, greater than that required in an autoclave to digest the same scrap there is sufficient pressure of the vapors from the oil adequately to penetrate and to carry forward the swelling of the rubber. It has been noted that we prefer, in the digesting procedure involving the use of pans rather than an autoclave, to use reclaiming oil having a greater proportion of lower boiling components, and to use the oil in a proportion from 30% to 50% greater than when used in autoclave work. That is a quantity equal to from about 5% to 18% the weight of the rubber.

After removal from the oven, the further treatment of the reclaim was identical with that described above with respect to stock which had been digested in an autoclave.

The ability of the resin-forming unsaturates to absorb sulphur during the digestion of the rubber is an important property. They have the capacity to take up sulphur at any conjugated double bond of their structure at temperatures no higher than from about 140° C. to 180° C., which temperatures are exceeded in the best standard processes of rubber reclamation. By their ability to absorb sulphur they tend to place the reclaim rubber in better condition for recompounding, because when pressure is released at the end of the digestion stage of the reclaiming process the resin-forming unsaturates vaporize off carrying with them the sulphur which they have absorbed. It may be noted at this point that the higher boiling aliphatic hydrocarbon oil tends to remain in the rubber stock, enduringly to soften and smooth it. Because the cut boiling below 210° C. has the best odor of any of the coke oven light oil cuts, and because of the aliphatic content of the reclaiming oil, its use gives the reclaimed rubber a better odor than do most reclaiming oils commonly in use.

In the digestion process itself the high surface tension possessed by the resin-forming unsaturates gives them not only high penetrating power, but also the ability to coat the surfaces of particles of rubber differing in size. In the digestion of the stock the higher boiling aliphatic oil provides in and on the particles of rubber a drying agent which at the end of the digestion leaves the stock in a condition which is not too tacky for working. The drying, softening and smoothing effects of the higher boiling aliphatic hydrocarbon oils are of great importance. While those properties of such oils are well known they are rendered available in our rubber-reclaiming oil in an order not previously attained. This is for the reason that the high penetrative property of the resin-forming unsaturates allows an increased proportion of the aliphatic oils to be used with a cut consisting essentially of those resin-forming unsaturates, so that full advantage of the desirable properties of the aliphatic hydrocarbon oils may be had while yet obtaining the necessary swelling and initial softening of the rubber stock for recompounding. It will be understood that the effect of the resin-forming unsaturates themselves on the rubber is an active softening effect, and their use without a substantial proportion of aliphatic hydrocarbon oil with its tendency to dry as well as permanently to soften the stock would give as a product of digestion a mass of rubber too incoherent, pasty and tacky to be in a condition suitable for working.

We have found that any well known single substance selected as combining the penetrative and swelling action of the resin-forming unsaturates of the crude (unpolymerized) cut and the drying and permanent softening effect of the aliphatic hydrocarbon oil is unsatisfactory in practice. Thus oils composed of the dimers of coumarone and indene or styrene in the lowest stage of polymerization of those substances, while having good solvent power, do not have good ability to penetrate and swell the rubber. Their effect in the digestion process is, therefore, to give a stock for recompounding in which the particles either remain unsoftened interiorly, or in which the digestor batch as a whole is reduced to an unworkable mushy or tacky condition. The same is true of various other relatively high boiling oils, such as pine oil, tar oil, naphthenic oil and the dimers of the resin-forming unsaturates of turpentine and petroleum.

We claim as our invention:

1. The method of digesting scrap rubber for reclaiming by subjecting the scrap rubber in finely divided condition to heat and the pressure of vapors in a closed vessel at a temperature from about 300° F. to 500° F. for from about 7 to 40 hours in contact with about 4% to 18% its weight of an oil composed about 50% to 80% of a cut of crude coke oven light oil boiling more than 60% within the approximate range of 135° C. to 210° C. and containing over 50% of unpolymerized resin-forming unsaturates and about 20% to 80% of a non-resin-forming aliphatic hydrocarbon oil from the distillation of petroleum oil boiling within the approximate range of 200° C. to 280° C.

2. The method of digesting scrap rubber for reclaiming by subjecting the said scrap rubber in finely divided condition to heat and the pressure of vapors in a closed vessel at a temperature from about 300° F. to 500° F. for from about 7 to 40 hours in contact with about 4% to 18% its weight of an oil composed about 60% of a cut of crude coke oven light oil boiling more than 60% within the approximate range of 135° C. to 210° C. and containing over 50% of unpolymerized resin-forming unsaturates and about 40% of a non-resin-forming aliphatic hydrocarbon oil from the distillation of petroleum oil boiling within the approximate range of 200° C. to 280° C.

3. A rubber-reclaiming oil consisting in substantial entirety of a blend composed about 50% to 80% of a cut of coke oven light oil boiling more than 60% within the approximate range of 135° C. to 210° C. and consisting over 50% of unpolymerized resin-forming unsaturates, and about 20% to 50% of a non-resin-forming aliphatic hydrocarbon oil from the distillation of petroleum oil boiling within the approximate range of 200° C. to 280° C.

4. A rubber-reclaiming oil consisting in substantial entirety of a blend composed about 60% of a cut of coke oven light oil boiling more than 60% within the approximate range of 135° C. to 210° C. and consisting over 50% of unpolymerized resin-forming unsaturates, and about 40% of a non-resin-forming aliphatic hydrocarbon oil from the distillation of petroleum oil boiling within the approximate range of 200° C. to 280° C.

CHARLES H. CAMPBELL.
ROBERT W. OSTERMAYER.

(References on following page)

REFERENCES CITED

The following references are of record in the file of this patent:

UNITED STATES PATENTS

| Number | Name | Date |
|---|---|---|
| 1,613,673 | Ostromislensky | Jan. 11, 1927 |
| 1,793,161 | Cowdery | Feb. 17, 1931 |
| 2,021,046 | Campbell | Nov. 12, 1935 |
| 2,069,927 | Rhodes et al. | Feb. 9, 1937 |
| 2,069,929 | Swanberg | Feb. 9, 1937 |
| 2,081,448 | Carmody | May 25, 1937 |
| 2,145,341 | Campbell | Jan. 31, 1939 |
| 2,149,577 | Carmody | Mar. 7, 1939 |
| 2,244,654 | Rostler et al. | June 3, 1941 |
| 2,381,506 | Loane | Aug. 7, 1945 |

OTHER REFERENCES

Whitehead, "Benzol" (1920), pages 165 and 195.